May 8, 1962

R. ADELL 3,033,405

DEVICE FOR HOLDING ADDITIVE FOR MOTOR
VEHICLE WINDSHIELD WASHING LIQUID
Filed April 3, 1961

INVENTOR.
ROBERT ADELL

BY Gregory S. Dolgorukov

ATTORNEYS

United States Patent Office 3,033,405
Patented May 8, 1962

3,033,405
DEVICE FOR HOLDING ADDITIVE FOR MOTOR VEHICLE WINDSHIELD WASHING LIQUID
Robert Adell, Detroit, Mich., assignor to Adell Chemical Corporation, Detroit, Mich., a corporation of Michigan
Filed Apr. 3, 1961, Ser. No. 100,209
2 Claims. (Cl. 215—1)

This invention relates to motor vehicles, and more particularly to an improved device for storing therein additive for the liquid used in windshield washer mechanisms of such vehicles. The present application is a continuation-in-part of my co-pending application Serial No. 828,289 filed July 20, 1959, for Device for Holding Additive for Windshield Washing Liquid.

In utilizing the device disclosed by my said co-pending application, the advantages of such device have been fully realized for a large number of motor vehicles of various types. However, it was also found that some motor vehicles and their engine compartments are of such construction and have such distribution of various parts and engine accessories in such compartments as to leave virtually no free wall or support space where my device can be properly installed. It was taken, therefore, by many potential users of my devices that some motor vehicles are not sutiable to have a device of this nature conveniently and properly installed therein. As a result, many such potential users have been deprived of the convenience and advantages afforded by my device.

One of the objects of the present invention is to provide an improved holder for the device for storing additive for windshield washing liquid, whereby the above difficulties and disadvantages are overcome and largely eliminated without introducing new problems or increasing in any appreciable manner the cost involved.

Another object of the invention is to provide an improved holder of the above nature which may be installed under the engine hood of almost any motor vehicle, utilizing whatever available space may be found therein and irrespective of the fact whether, after being installed, the bottle holding the additive is in a vertical, inclined or horizontal position, or even disposed upside down.

A further object of the present invention is to provide an improved holder of the nature specified above which holds the bottle for the additive in a secure and resiliently tight manner irrespective of the position of such bottle, and with the use of which the bottle can be easily taken out and returned to its place in the holder.

A further object of the present invention is to provide an improved holder of the above nature which is simple and rugged in construction, dependable in operation and is relatively inexpensive to manufacture.

Further objects and advantages of this invention will be apparent from the following description and appended claims, reference being had to the accompanying drawings forming a part of the specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Figure 1:
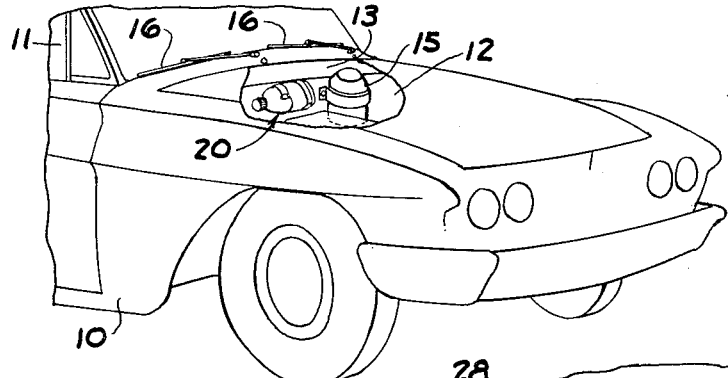
FIG. 1 is a fragmentary perspective view illustrating the front portion of a motor vehicle having mounted within its engine compartment a device embodying the present invention.

In the drawing there is shown, by way of example, a device embodying the present invention. Referring specifically to FIG. 1, there is shown therein a portion of a motor vehicle generally designated by the numeral 10 and including a passenger compartment 11 and an engine compartment 12. A partition or fire wall designated by the numeral 13 is provided between said compartments 11 and 12 for separating the same. A washing liquid jar or container 15 is permanently mounted in a manner well known in the art on said partition 13 and is adapted to hold a quantity of washing liquid to be delivered by a pump (not shown) to the nozzles, when the pump is manually actuated, to squirt such liquid on the outside surface of the windshield, thus engaging the windshield wipers 16 to rub off any dirt that may accumulate on the surface of the windshield.

In accordance with the invention, my improved device generally designated by the numeral 20 is mounted adjacent to the container or jar 15. Therefore, it can be easily reached and used in connection with the jar 15 without the necessity of the filling station attendant walking around the vehicle and reaching into the glove compartment of the vehicle, for which operation opening the right-hand door or lowering the window is necessary or asking the vehicle operator to get such bottle out of the glove compartment and handing it over. For the latter operation the vehicle operator must either move to the right in the front seat or reach far to the right to open such compartment and to locate the bottle.

Figure 2:
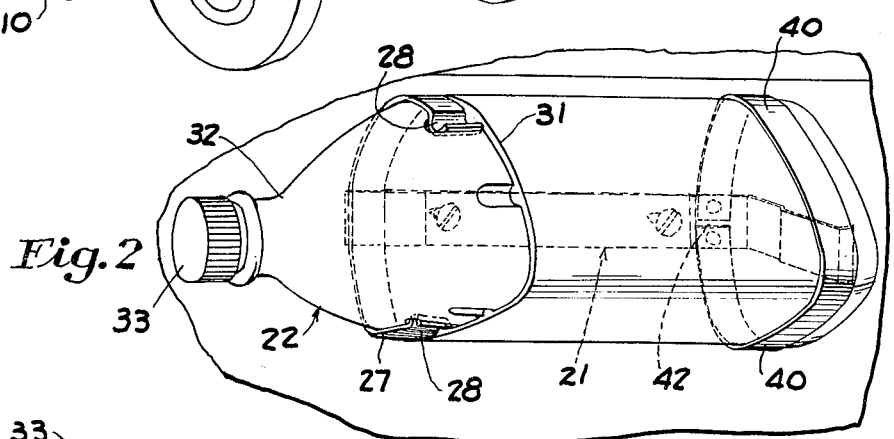
FIG. 2 is a perspective view of the device shown separately and on an enlarged scale, said device being shown in a horizontal position, which is its operative position in the illustrated installation.
Figure 3:
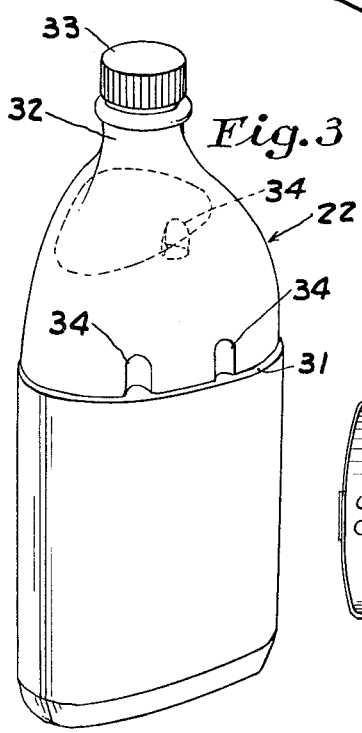
FIG. 3 is a perspective view showing the glass bottle in a vertical position.
Figure 4:
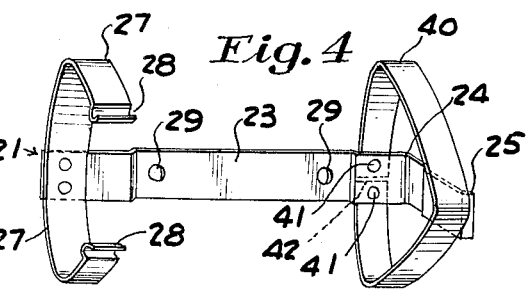
FIG. 4 is a perspective view of a bottle supporting bracket.

Referring to FIGS. 2–4, my improved device comprises a holding bracket generally designated by the numeral 21, made of spring material such as spring steel, and a container or bottle 22 made preferably, but not necessarily, of glass. The bottle 22 has been described in detail in my co-pending application above referred to, and, therefore, it is described herein only to the extent necessary for a proper understanding of the present invention.

The holding bracket 21 comprises a strip 23 having one of its ends bent at a right angle as shown at 24 to provide a bar or extension 25 adapted to engage the bottle 22 at its bottom, irrespective of the fact whether said bottle is mounted in a horizontal, vertical or any other position. A substantial radius, such as ⅜", is provided at 24 in order to clear properly the bead provided around the bottom of the bottle and to ensure proper resiliency of the bracket at that particular location and to prevent origination of cracks and failure of the material due to fatigue stresses caused by repeated straining of the material at that point.

The opposite end of the strip 23 has secured thereto in any suitable manner, such as by riveting, a C-shaped clip 27 made of resilient material. The free ends of the C are provided with inwardly extending rounded bends 28 for engaging the bottle in the manner explained below. Holes 29 are provided in the strip 23 for securing the bracket to any supporting surface.

In the present embodiment of the invention a glass bottle 22 having a triangular cross section with the corners rounded on approximately 1" radius is used. While with the use of my supporting bracket bottles of other cross section, including the round cross section, also give good results, the bottle of triangular cross section is of particular advantage as providing an exceedingly convenient and strong hold for the hand. A shoulder 31 is provided around the upper portion of the bottle 22 and at such location that the edges of the clip 27 bear on said shoulder and prevent the bottle from moving. At its top the bottle is reduced to provide a round throat 32, the top of which is adapted to receive a screw-on cap 33.

On each of the three sides of the bottle and immediately adjacent to the shoulder 31 there are provided, at equal distances from the corners of the bottle, two depressions 34 adapted to receive the rounded ends 28 of the C-shaped clip 27. From examination of the drawing it will be seen that when the bottle is in place, only one of the depressions 34 on each of two sides of the bottle is engaged by said rounded portion 28 of the clip 27 with the other depression remaining inactive. However, by the provision of two depressions, the bottle is adapted to be inserted in place with any one of its three sides bearing against the strip 23 of the supporting bracket.

In order to ensure reliable holding of the bottle in the bracket, there is provided near the bottom-engaging end 25 of the bracket a second clip 40 riveted as indicated at 41 to the strip 23. The clip 40 has a shape corresponding to the cross section of the bottle 22 and, therefore, the bottle may be inserted into said clip 40 as deep as is permitted by the end 25. The ends of the clip 40 are spaced from each other as shown at 42 and are individually riveted with the use of pivot rivets. By virtue of such construction the ends may pivot on the piece 23 within predetermined limits permitting the clip to be bodily turned on the strip 23 for more convenient removal and reinsertion of the bottle. By virtue of such an expedient, the clip 40 is made floating and does not bind the bottle but adjusts itself to the position of the bottle in removal thereof from the bracket and returning the bottle thereinto. Yet in the mounted position of the bottle the clip 40 ensures secure holding of the bottle in place.

Figure 5:
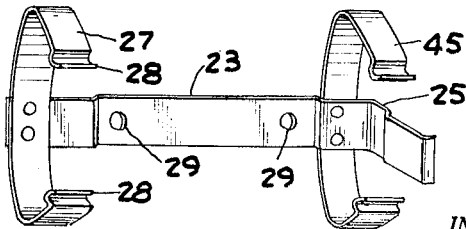
FIG. 5 is a view similar in part to FIG. 4 and showing a bracket of a modified construction.

FIG. 5 shows a modified construction of the holding bracket. The main feature of difference between the constructions of FIGS. 4 and 5 resides in the construction of the clip 45 which, in the construction of FIG. 5 is identical with the clip 27 thereof. Therefore, in the construction of FIG. 5 both clips are open and resilient. By virtue of such a construction the clip 45 adjusts itself by its resiliency to the position of the bottle. However, the bracket of FIG. 5 has an additional advantage of decreased costs since the same clip may be used for both the top and the bottom of the bracket.

It will be understood that while the supporting bracket, such as 21, and the bottle, such as 22, have been referred to above as forming my improved device for holding additive for windshield washing liquid, such device is divisible in the sense that an automobile may be equipped with the supporting bracket, such as 21, and thus be adapted to receive a bottle, such as 22, of additive which can be purchased at any time later at a filling station. Thus, an automobile equipped with such supporting bracket is an improvement over conventional automobiles for the reasons explained above.

There is thus provided an improved device of the nature described whereby the objects of the present invention and numerous additional advantages are attained.

I claim:

1. A device for holding a supply of liquid additive for a windshield washer water container, said device comprising a bottle of a triangular cross section and having a shoulder directed toward the neck of the bottle, a bracket made of spring material and adapted to be installed in an engine compartment of a motor vehicle to receive and support said glass bottle, said bracket comprising a strip of spring material having its lower end bent to provide an extension reaching under the bottom of the bottle and pressing it in the direction of the shoulder, a bottle-embracing clip provided at the top of said bracket to embrace said bottle and to be contacted by said shoulder to resist the force of said extension, and a second bottle-embracing clip provided at the bottom of the bracket and adapted to embrace said bottle near the bottom thereof.

2. A device for holding a supply of liquid additive for a windshield washer water container, said device comprising a glass bottle having a triangular cross section with rounded corners, said bottle being provided with a shoulder having an upwardly open surface and two depressions immediately adjacent said shoulder at the upper portion of each of its three sides at equal distances from the corners of the bottle; a bracket made of resilient material and adapted to receive and support said glass bottle, a C-shaped resilient clip secured to the upper end of said strip, the ends of said clip being shaped to enter the near depression, said bracket including a strip of a resilient material having its lower end bent to exert pressure on the bottom of the bottle and press said shoulder against said clip, and an identical clip secured to said strip near the lower end thereof and adapted to embrace the lower end of said bottle, twisting of said bottle causing opening of said clips and releasing said bottle for withdrawal from said bracket.

References Cited in the file of this patent

UNITED STATES PATENTS

| | | |
|---|---|---|
| 1,446,474 | Mahnken | Feb. 27, 1923 |
| 1,965,726 | Smith | July 10, 1934 |